May 23, 1933. L. N. HAYDEN 1,910,951
SEPARABLE FASTENER AND ATTACHING MEANS FOR THE SAME
Filed Sept. 29, 1931
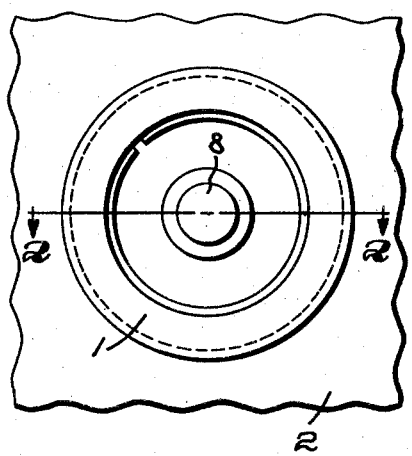
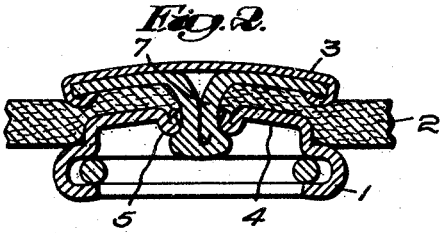
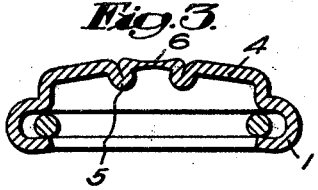
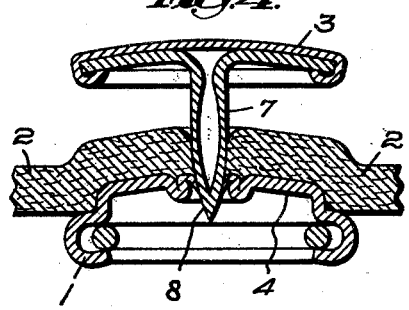
Inventor:
Lester N. Hayden
by Emery, Booth, Varney & Townsend
Attys Patented May 23, 1933

1,910,951

UNITED STATES PATENT OFFICE

LESTER N. HAYDEN, OF ARLINGTON, MASSACHUSETTS, ASSIGNOR TO UNITED-CARR FASTENER CORPORATION, OF CAMBRIDGE, MASSACHUSETTS, A CORPORATION OF MASSACHUSETTS

SEPARABLE FASTENER AND ATTACHING MEANS FOR THE SAME

Application filed September 29, 1931. Serial No. 565,742.

My invention aims to provide improvements in separable fasteners and relates more particularly to means used in connection with the attachment of the fastener to a supporting structure.

Referring to the drawing which illustrates a preferred embodiment of my invention:—

Figure 1 is a plan view of a snap fastener socket installation as viewed from the socket side thereof;

Fig. 2 is a section taken on the line 2—2 of Figure 1;

Fig. 3 is a section through the socket member prior to attachment to its supporting structure; and Fig. 4 is a section through the installation showing the manner of attachment of the parts thereof.

While I have illustrated in the drawing a preferred embodiment of my invention relating to snap fastener sockets and installations thereof, it should be understood that my invention is also adapted for use in connection with snap fastener stud members, buttons and the like.

In the particular illustration of my invention disclosed by the drawing I have shown a separable fastener member 1 adapted to be attached to a flexible carrying medium 2 by means of an attaching member 3 which is illustrated as a hollow sheet metal tack.

The fastener member 1, prior to attachment to the support 2 (Fig. 3), has a support-engaging face 4 the central portion of which is provided with an annular rib or ribs 5 surrounding a tack-piercing portion 6. The tack-piercing portion 6 is pressed or otherwise suitably formed to present a portion which is relatively thin especially at the center thereof with respect to the thickness of the remainder of the fabric-engaging portion 4. It will be seen, therefore, that the rib or ribs 5 provide reinforcing means adjacent to the tack-piercing portion 6 to prevent distortion of the portion 4 when a tack is forced through the relatively thin portion 6, as illustrated in Fig. 4.

The tack 3 is provided with a shank 7 having a relatively sharp point 8 so that when it is forced through the carrying medium 2 (Fig. 4) it will pierce, relatively easily, the thin portion 6 provided in the fastener member 1. In this connection, it will be noted that the reinforcing means 5 is of sufficient diameter to permit the material of the portion 6 to be spread laterally outwardly (Fig. 2) so that it will engage the reinforcing means and prevent lateral expansion of the shank of the tack when the pointed end 8 is upset and riveted, as best illustrated in Fig. 2. Thus the reinforcing means 5 not only prevents distortion of the portion 4 during the piercing operation of the portion 6 but also back-supports the shank 7 of the tack to provide for a neat as well as a rigid clamping of the parts 1 and 3 to the carrying medium 2. It should be noted also that the reinforcing means strengthens the structure to prevent the upset portion (Fig. 2) of the tack from pulling away from the fastener member when the parts are subjected to stresses.

My invention is particularly desirable because the tack will pierce the portion 6 readily and at the same time the portion 6 will engage the shank of the tack closely during the attaching operation and prevent the material 2 from being drawn into the fastener member. Heretofore, hollow rivets, tacks and the like have been entered through preformed apertures in the fastener members and have drawn the material into the fasteners. This results in the material being wrinkled and torn, thereby providing an imperfect attachment. The thin portion of my device does away with the necessity for exact alignment as is necessary with preformed apertured devices and more important it acts in such a manner that the thin portion 6 strips the material 2 from the sides of the shank of the tack and leaves the material untorn and unwrinkled.

While I have illustrated and described a preferred embodiment of my invention I do not wish to be limited thereby, because the scope of my invention is best defined by the following claims.

I claim:

1. A fastener installation comprising, in combination, a separable fastener member, a fastener-carrying medium and an attaching member, a carrying medium engaging metallic plate portion presented by said fastener member against one side of the carrying medium, a sharp pointed shank extending from said attaching member through said carrying medium and said plate portion and having its pointed end upset to secure the parts of the installation together, and said plate portion, before attachment, having a portion at the center only of substantially reduced thickness with respect to the remainder of the plate portion where the sharp point pierces it to facilitate assembly of the members of the installation and prevent distortion of the remainder of the plate portion when the shank is piercing the same.

2. A fastener installation comprising, in combination, a separable fastener member, a fastener-carrying medium and an attaching member, a carrying medium engaging plate portion presented by said fastener member against one side of the carrying medium, a sharp pointed shank extending from said attaching member through said carrying medium and said plate portion and having its pointed end upset to secure the parts of the installation together and said plate portion, before attachment, having a centrally located annular reinforcing means surrounding a portion to be pierced by the sharp pointed shank and said portion to be pierced being of a thickness less than the remaining plate portion and of decreasing thickness from the reinforcing means toward the center.

3. A fastener installation comprising, in combination, a separable fastener member, a fastener-carrying medium and an attaching member, a carrying medium engaging plate portion presented by said fastener member against one side of the carrying medium, a sharp pointed shank extending from said attaching member through said carrying medium and said plate portion and having its pointed end upset to secure the parts of the installation together, and said plate portion, before attachment having a portion of substantially reduced thickness with respect to the remainder of the plate portion where the sharp point pierces it to facilitate assembly of the members of the installation and annular reinforcing rib means formed in said plate portion and surrounding the thin portion thereof a substantial distance inwardly of the outer periphery of said plate portion for the purposes illustrated and described.

In testimony whereof, I have signed my name to this specification.

LESTER N. HAYDEN.